United States Patent
Han et al.

(10) Patent No.: US 12,378,686 B2
(45) Date of Patent: Aug. 5, 2025

(54) DEVICE AND METHOD FOR RECOVERING BY-PRODUCT OXYGEN OF HYDROGEN PRODUCTION FROM ELECTROLYZED WATER BY LOW-TEMPERATURE METHOD

(71) Applicant: HANGZHOU OXYGEN PLANT GROUP CO., LTD., Hangzhou (CN)

(72) Inventors: Yisong Han, Hangzhou (CN); Fang Tan, Hangzhou (CN); Xudong Peng, Hangzhou (CN); Ling Li, Hangzhou (CN); Lei Yao, Hangzhou (CN); Lijian Lao, Hangzhou (CN); Xin Song, Hangzhou (CN); Yunyun Jiang, Hangzhou (CN); Dongdong Zhao, Hangzhou (CN); Xiaoyu Xie, Hangzhou (CN)

(73) Assignee: HANGZHOU OXYGEN PLANT GROUP CO., LTD., Hangzhou (CN)

( * ) Notice: Subject to any disclaimer, the term of this patent is extended or adjusted under 35 U.S.C. 154(b) by 586 days.

(21) Appl. No.: 17/932,308

(22) Filed: Sep. 15, 2022

(65) Prior Publication Data

US 2023/0092115 A1 Mar. 23, 2023

(30) Foreign Application Priority Data

Sep. 18, 2021 (CN) .......................... 202111096848.5

(51) Int. Cl.
*C25B 15/08* (2006.01)
*B01J 21/04* (2006.01)
(Continued)

(52) U.S. Cl.
CPC .............. *C25B 15/085* (2021.01); *B01J 21/04* (2013.01); *B01J 23/63* (2013.01);
(Continued)

(58) Field of Classification Search
CPC ... C25B 15/081; C25B 15/083; C25B 15/085; C25B 1/04; C25B 1/042; C25B 1/044;
(Continued)

(56) References Cited

U.S. PATENT DOCUMENTS

| | | | |
|---|---|---|---|
| 2023/0212759 A1* | 7/2023 | Kromer | C01B 13/0277 205/637 |
| 2023/0212768 A1* | 7/2023 | Han | F25J 3/04412 423/579 |
| 2024/0035175 A1* | 2/2024 | Kim | C25B 9/77 |

\* cited by examiner

*Primary Examiner* — Robert Clemente
(74) *Attorney, Agent, or Firm* — Proi Intellectual Property US

(57) ABSTRACT

A device and a method for recovering by-product oxygen from water-electrolysis hydrogen production using a low-temperature method are provided, solving the waste problem of by-product oxygen in the green water-electrolysis hydrogen production system. The device according to the present disclosure comprises an oxygen clarifying system, a pressurizing and heat exchanging system, and a circulating gas compression and expansion refrigeration system. The recovering method according to the present disclosure comprises the following steps: first clarifying and purifying the by-product oxygen from water-electrolysis hydrogen production is to remove hydrogen, carbon monoxide, carbon dioxide, water and other impurities in the oxygen; and then, liquefying, pressurizing and heat exchanging the pure oxygen to obtain the product oxygen and liquid oxygen with required pressure. In the whole process, the cooling capacity is provided by the circulating gas expansion refrigeration system.

8 Claims, 4 Drawing Sheets

(51) Int. Cl.
*B01J 23/63* (2006.01)
*C01B 13/02* (2006.01)
*C25B 1/04* (2021.01)
*F25J 1/00* (2006.01)

(52) U.S. Cl.
CPC ............ *C01B 13/0237* (2013.01); *C25B 1/04* (2013.01); *C25B 15/081* (2021.01); *C25B 15/083* (2021.01); *F25J 1/0017* (2013.01); *C01B 2210/0004* (2013.01); *C01B 2210/005* (2013.01); *C01B 2210/0053* (2013.01)

(58) Field of Classification Search
CPC ... B01J 21/04; B01J 23/30; B01J 23/40; B01J 23/42; B01J 23/44; B01J 23/63; C01B 13/0237; C01B 2210/0004; C01B 2210/005; C01B 2210/0053

See application file for complete search history.

DEVICE AND METHOD FOR RECOVERING BY-PRODUCT OXYGEN OF HYDROGEN PRODUCTION FROM ELECTROLYZED WATER BY LOW-TEMPERATURE METHOD

TECHNICAL FIELD

The present disclosure relates to gas separation technology, in particular to a device and a method for recovering by-product oxygen from water-electrolysis hydrogen production using a low-temperature method, and belongs to the technical field of hydrogen production and oxygen production.

BACKGROUND

As a clean energy, green hydrogen energy is increasingly used in the market. Green electricity resources generated by power generation using wind, light, water and other renewable energy sources are combined with a green water-electrolysis project to produce green hydrogen is a method with good development prospects. When hydrogen is produced by electrolyzed water, the by-product oxygen of the cathode is often directly emptied, which is not safe and economical. How to recover and make rational use of the by-product oxygen of green water-electrolysis hydrogen production in an environmentally-friendly manner is an urgent problem to be solved in the green water-electrolysis hydrogen production process, which is conducive to the economic utilization and popularization of green hydrogen technology.

Using a cryogenic air separation device to produce high-pressure oxygen and liquid oxygen is the most common method in the market at present, and it is also the most economical method. Even so, the product performance of JB/T 8693-2015 "Large- and Medium-sized Air Separation Device" 5.3 requires that the unit consumption of oxygen production with oxygen pressure not higher than 3.0 MPaG specified in the basic performance parameters should be between 0.599 and 0.65 KW·h/m$^3$.

Therefore, a safe and efficient method and a device for recovering by-product oxygen from green water-electrolysis hydrogen production using a low-temperature method are designed, so as to convert the waste and emptied by-product oxygen from green water-electrolysis hydrogen production into high-pressure oxygen or liquid oxygen required by other devices of users, turn waste into wealth, greatly reduce the unit consumption of oxygen production of high-pressure oxygen and liquid oxygen required by users, and reduce the overall carbon emission of users, which has become an urgent problem to be solved by those skilled in the art.

SUMMARY

The technical problem to be solved by the present disclosure is to provide a device and a method for recovering by-product oxygen from water-electrolysis hydrogen production using a low-temperature method, solving the waste problem of by-product oxygen in the green water-electrolysis hydrogen production process, and at the same time reducing the overall carbon emissions of users and achieving the purpose of high efficiency and energy saving. In order to achieve the above purpose, the present disclosure uses the following technologies. A device for recovering by-product oxygen from water-electrolysis hydrogen production using a low-temperature method is provided, wherein the device for recovering by-product oxygen from water-electrolysis hydrogen production comprises an oxygen clarifying system, a pressurizing and heat exchanging system, and a circulating gas compression and expansion refrigeration system; the oxygen clarifying system comprises an oxygen self-superheater, an oxygen heater, an oxygen purifier, a water chilling unit, an oxygen clarifier, a valve and a straight pipe section through which various devices are all connected to obtain pure oxygen, wherein the oxygen input end of the oxygen self-superheater is connected to the oxygen output end of a water-electrolysis hydrogen production system, the oxygen output end of the oxygen self-superheater is connected to the oxygen input end of an oxygen heater, the oxygen output end of the oxygen heater is connected to the oxygen input end of the oxygen purifier, the purified oxygen output end of the oxygen purifier is connected to the oxygen input end of the water chilling unit, the oxygen output end of the water chilling unit is connected to the oxygen input end of the oxygen clarifier, and the clarified oxygen at the output end of the oxygen clarifier is sent to the pressurizing and heat exchanging system through a pipeline.

Preferably, the pressurizing and heat exchanging system comprises a plate heat exchanger, a cold box and a low-temperature liquid oxygen pump, the circulating gas compression and expansion refrigeration system comprises a gas compression system and an expansion refrigeration system; the compression system comprises a gas booster for obtaining compressed gas; and the expansion refrigeration system comprises at least one booster turboexpander, a pressurizing end of the expander, a cooler and an expansion end of the expander.

Preferably, the circulating gas compression and expansion refrigeration system is highly coupled with the pressurizing and heat exchanging system, a stream of circulating gas is introduced into the circulating gas compression and expansion refrigeration system from the outside, the plate heat exchanger is provided with three positive flow channels and three reverse flow channels, the three positive flow channels comprise a clarified oxygen channel, a pressurized gas channel and a pressurized expansion gas channel, respectively, the three reverse flow channels comprise a high-pressure oxygen product channel, a throttle gas recovery channel and an expansion gas recovery channel, respectively, the input end of the clarified oxygen channel of the plate heat exchanger is connected to the oxygen output end of the oxygen clarifier, the output end of the clarified oxygen channel of the plate heat exchanger is connected to the input end of the liquid oxygen pump; the input end of the pressurized gas channel of the plate heat exchanger is connected to the output end of an aftercooler at the compression end of the booster turboexpander, the output end of the pressurized gas channel of the plate heat exchanger is connected to the input end of a throttle valve; the input end of the pressurized expansion gas channel of the plate heat exchanger is connected to a section of the output end of a circulating compressor, the output end of the pressurized expansion gas channel of the plate heat exchanger is connected to the input end of the expansion end of the expander; the input end of the high-pressure oxygen product channel of the plate heat exchanger is connected to the output end of the liquid oxygen pump, the output end of the oxygen product channel of the plate heat exchanger is connected to the output pipeline of the high-pressure oxygen product; the input end of the throttle gas recovery channel of the plate heat exchanger is connected to the output end of the throttle valve, the output end of the throttle gas recovery channel of the plate heat exchanger is connected to the input end of the circulating compressor; the input end of the expansion gas recovery channel of the plate heat exchanger is connected to the output end of the expansion end of the expander, the output end of the expansion gas recovery channel of the plate heat exchanger is connected to the input end of the circulating compressor, the input end of the circulating compressor is connected to the output ends of the throttling gas recovery channel and the expansion gas recovery channel of the plate heat exchanger, a section of the output end of the circulating compressor is connected to the input end of the pressurized expansion gas of the plate heat exchanger, the last-stage output end of the circulating compressor is connected to the pressurizing end of the expander, the input end of the pressurizing end of the expander is connected to the last-stage output end of the circulating compressor, and the output end of the pressurizing end of the expander is connected to the input end of the cooler.

Preferably, the device for recovering by-product oxygen from water-electrolysis hydrogen production is also capable of producing liquid oxygen products, when collecting the products, the liquid oxygen pump is used to pressurize the liquid oxygen to high-pressure liquid oxygen, the circulating gas is used to pressurize and exchange heat, and the high-pressure liquid oxygen is gasified into high-pressure oxygen.

Preferably, the circulating gas in the circulating gas compression and expansion refrigeration system is one of or a combination of several of nitrogen, air, argon or other gases suitable for circulation.

A method of the device for recovering by-product oxygen from water-electrolysis hydrogen production using a low-temperature method is provided, wherein the method comprises the following steps:

step 1: the by-product oxygen from the green water-electrolysis hydrogen production device enters the oxygen self-superheater, is preheated to a certain temperature, directly enters the oxygen clarifier through a pipeline when the temperature meets the requirement of entering the oxygen clarifier, and first enters an oxygen heater when the oxygen self-overheating temperature does not meet the requirement of entering the oxygen clarifier, and then enters the oxygen clarifier after being heated; the heated oxygen undergoes a chemical reaction in the oxygen clarifier, converts the impurity $H_2$ in the oxygen into $H_2O$, and converts CO into $CO_2$; after the reaction, the oxygen enters the hot end of the oxygen self-superheater, exchanges heat with the by-product oxygen from the water-electrolysis hydrogen production device to reduce the temperature, and continues to reduce the temperature after being cooled by a cooling unit, the water condensed at the bottom is directly drained in this process, and the cooled gas enters the oxygen purifier to remove impurities in the oxygen;

step 2, the purified oxygen enters a plate heat exchanger, and exchanges heat with the expanded argon of back flow in the heat exchanger, so that the oxygen is cooled to a liquid state to obtain liquid oxygen, which is divided into two streams, in which one stream of liquid is directly collected from a cold box to obtain liquid oxygen products; the stream of liquid raises the pressure of liquid oxygen by the liquid oxygen pump, and then is sent to the cold end of the plate heat exchanger for heat exchange to obtain pressurized oxygen;

step 3: a stream of supplemental circulating argon is mixed with the expanded argon flowing back from the plate heat exchanger, enters the gas compressor for compression, and is divided into two parts after pressurization, one part of pressurized argon pumped out from the middle of the booster is sent to the plate heat exchanger, and is pumped out and sent to the expander for expansion after being cooled to a certain temperature in the middle via the plate heat exchanger, the expanded argon is returned to the cold end of the plate heat exchanger to cool hot fluid as a cold source, and the returned argon is reheated and then discharged from the hot end of the plate heat exchanger and sent to the inlet of the circulating booster; the other part of argon is pumped out from the last-stage output end of the booster and sent to the pressurizing end of the expander for further pressurization and cooling, the pressurized and cooled circulating argon enters the plate heat exchanger to gasify high-pressure liquid oxygen as a high-pressure heat source, after being cooled by the plate heat exchanger, the high-pressure circulating argon is discharged from the plate heat exchanger and throttles back to the cold end of the plate heat exchanger to cool the hot fluid as a cold source, and the throttling fluid is reheated and then discharged from the hot end of the plate heat exchanger and sent to the inlet of the circulating booster.

Preferably, the active component of the catalyst used in the oxygen clarifier is one or more of palladium, platinum, cerium and oxides thereof.

Preferably, the purifying agents used in the oxygen purifier are alumina and molecular sieve; and the filling mode of the catalyst is structured packing.

The present disclosure has the following beneficial effects.

The present disclosure is used for recovering the by-product oxygen of green water-electrolysis hydrogen production, and converts the waste by-product oxygen of water-electrolysis hydrogen production into liquid oxygen and high-pressure oxygen with commercial value using a safe low-temperature method. The process form of the present disclosure is reasonably organized. The reasonable matching of the expander and the booster reduces the maximum heat exchange temperature difference, reduces reheating, makes up the cold loss, and realizes safe and efficient liquefaction of oxygen and gasification of high-pressure liquid oxygen. According to the present disclosure, the liquid oxygen product can be directly obtained by the heat exchanger, and the pressurized oxygen product obtained by heat exchange after the liquid oxygen is pressurized by the liquid oxygen pump has high pressure. The expansion refrigeration gas used in the present disclosure can be recycled, which is energy-saving and environment-friendly. According to the present disclosure, the by-product oxygen of green water-electrolysis hydrogen production is changed into wealth and is delivered to users of high-pressure oxygen. The energy consumption of high-pressure gas oxygen per production unit is not higher than 0.13 KW·h/m$^3$, which is much lower than the unit consumption of high-pressure oxygen produced by the conventional low-temperature distillation method, thus reducing carbon emissions and realizing a win-win situation of enterprise economic benefits and environmental benefits.

DETAILED DESCRIPTION OF THE EMBODIMENTS

Figure 1:
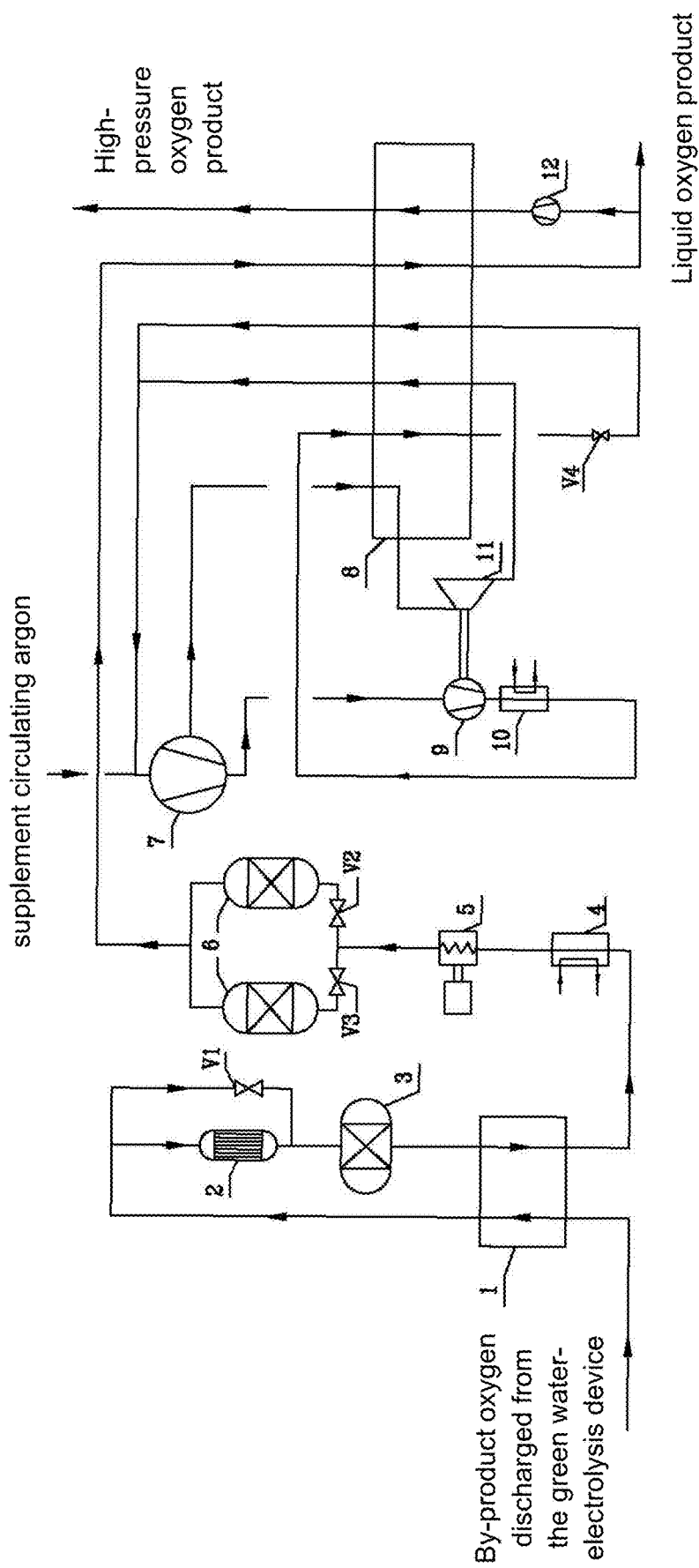
FIG. 1 is a schematic diagram of the present disclosure.

The present disclosure will be described in detail with reference to the accompanying drawings hereinafter. As shown in FIGS. 1-4, a device for recovering by-product oxygen from water-electrolysis hydrogen production using a low-temperature method is provided, wherein the device for recovering by-product oxygen from water-electrolysis hydrogen production comprises an oxygen clarifying system, a pressurizing and heat exchanging system, and a circulating gas compression and expansion refrigeration system; the oxygen clarifying system comprises an oxygen self-superheater 1, an oxygen heater 2, an oxygen purifier 3, a water chilling unit 4, an oxygen clarifier 6, a valve and a straight pipe section through which various devices are all connected to obtain pure oxygen, wherein the oxygen input end of the oxygen self-superheater 1 is connected to the oxygen output end of a water-electrolysis hydrogen production system, the oxygen output end of the oxygen self-superheater 1 is connected to the oxygen input end of an oxygen heater 2, the oxygen output end of the oxygen heater 2 is connected to the oxygen input end of the oxygen purifier 3, the purified oxygen output end of the oxygen purifier is connected to the oxygen input end of the water chilling unit 4, the oxygen output end of the water chilling unit 4 is connected to the oxygen input end of the oxygen clarifier 6, and the clarified oxygen at the output end of the oxygen clarifier 6 is sent to the pressurizing and heat exchanging system through a pipeline.

The pressurizing and heat exchanging system comprises a plate heat exchanger 8, a cold box and a low-temperature liquid oxygen pump 12, the circulating gas compression and expansion refrigeration system comprises a gas compression system and an expansion refrigeration system; the compression system comprises a gas booster 7 for obtaining compressed gas; and the expansion refrigeration system comprises at least one booster turboexpander, a pressurizing end 9 of the expander, a cooler 10 and an expansion end 11 of the expander.

The circulating gas compression and expansion refrigeration system is highly coupled with the pressurizing and heat exchanging system, a stream of circulating gas is introduced into the circulating gas compression and expansion refrigeration system from the outside, the plate heat exchanger 8 is provided with three positive flow channels and three reverse flow channels, the three positive flow channels comprise a clarified oxygen channel, a pressurized gas channel and a pressurized expansion gas channel, respectively, the three reverse flow channels comprise a high-pressure oxygen product channel, a throttle gas recovery channel and an expansion gas recovery channel, respectively, the input end of the clarified oxygen channel of the plate heat exchanger 8 is connected to the oxygen output end of the oxygen clarifier 6, the output end of the clarified oxygen channel of the plate heat exchanger 8 is connected to the input end of the liquid oxygen pump 12; the input end of the pressurized gas channel of the plate heat exchanger 8 is connected to the output end of an aftercooler 10 at the compression end 9 of the booster turboexpander, the output end of the pressurized gas channel of the plate heat exchanger 8 is connected to the input end of a throttle valve V4; the input end of the pressurized expansion gas channel of the plate heat exchanger 8 is connected to a section of the output end of a circulating compressor 7, the output end of the pressurized expansion gas channel of the plate heat exchanger 8 is connected to the input end of the expansion end 11 of the expander; the input end of the high-pressure oxygen product channel of the plate heat exchanger 8 is connected to the output end of the liquid oxygen pump 12, the output end of the oxygen product channel of the plate heat exchanger 8 is connected to the output pipeline of the high-pressure oxygen product; the input end of the throttle gas recovery channel of the plate heat exchanger 8 is connected to the output end of the throttle valve V4, the output end of the throttle gas recovery channel of the plate heat exchanger 8 is connected to the input end of the circulating compressor 7; the input end of the expansion gas recovery channel of the plate heat exchanger 8 is connected to the output end of the expansion end 11 of the expander, the output end of the expansion gas recovery channel of the plate heat exchanger 8 is connected to the input end of the circulating compressor 7, the input end of the circulating compressor 7 is connected to the output ends of the throttling gas recovery channel and the expansion gas recovery channel of the plate heat exchanger 8, a section of the output end of the circulating compressor 7 is connected to the input end of the pressurized expansion gas of the plate heat exchanger 8, the last-stage output end of the circulating compressor 7 is connected to the pressurizing end 9 of the expander, the input end of the pressurizing end 9 of the expander is connected to the last-stage output end of the circulating compressor 7, and the output end of the pressurizing end 9 of the expander is connected to the input end of the cooler 10.

The device for recovering by-product oxygen from water-electrolysis hydrogen production is also capable of producing liquid oxygen products, when collecting the products, the liquid oxygen pump is used to pressurize the liquid oxygen to high-pressure liquid oxygen, the circulating gas is used to pressurize and exchange heat, and the high-pressure liquid oxygen is gasified into high-pressure oxygen.

The circulating gas in the circulating gas compression and expansion refrigeration system is one of or a combination of several of nitrogen, air, argon or other gases suitable for circulation.

A method of the device for recovering by-product oxygen from water-electrolysis hydrogen production using a low-temperature method is provided, wherein the method comprises the following steps:

step 1: the by-product oxygen from the green water-electrolysis hydrogen production device enters the oxygen self-superheater, is preheated to a certain temperature, directly enters the oxygen clarifier through a pipeline when the temperature meets the requirement of entering the oxygen clarifier, and first enters an oxygen heater when the oxygen self-overheating temperature does not meet the requirement of entering the oxygen clarifier, and then enters the oxygen clarifier after being heated; the heated oxygen undergoes a chemical reaction in the oxygen clarifier, converts the impurity $H_2$ in the oxygen into $H_2O$, and converts CO into $CO_2$; after the reaction, the oxygen enters the hot end of the oxygen self-superheater, exchanges heat with the by-product oxygen from the water-electrolysis hydrogen production device to reduce the temperature, and continues to reduce the temperature after being cooled by a cooling unit, the water condensed at the bottom is directly drained in this process, and the cooled gas enters the oxygen purifier to remove impurities in the oxygen;

step 2, the purified oxygen enters a plate heat exchanger, and exchanges heat with the expanded argon of back flow in the heat exchanger, so that the oxygen is cooled to a liquid state to obtain liquid oxygen, which is divided into two streams, in which one stream of liquid is directly collected from a cold box to obtain liquid oxygen products; the stream of liquid raises the pressure of liquid oxygen by the liquid oxygen pump, and then is sent to the cold end of the plate heat exchanger for heat exchange to obtain pressurized oxygen;

step 3: a stream of supplemental circulating argon is mixed with the expanded argon flowing back from the plate heat exchanger, enters the gas compressor for compression, and is divided into two parts after pressurization, one part of pressurized argon pumped out from the middle of the booster is sent to the plate heat exchanger, and is pumped out and sent to the expander for expansion after being cooled to a certain temperature in the middle via the plate heat exchanger, the expanded argon is returned to the cold end of the plate heat exchanger to cool hot fluid as a cold source, and the returned argon is reheated and then discharged from the hot end of the plate heat exchanger and sent to the inlet of the circulating booster; the other part of argon is pumped out from the last-stage output end of the booster and sent to the pressurizing end of the expander for further pressurization and cooling, the pressurized and cooled circulating argon enters the plate heat exchanger to gasify high-pressure liquid oxygen as a high-pressure heat source, after being cooled by the plate heat exchanger, the high-pressure circulating argon is discharged from the plate heat exchanger and throttles back to the cold end of the plate heat exchanger to cool the hot fluid as a cold source, and the throttling fluid is reheated and then discharged from the hot end of the plate heat exchanger and sent to the inlet of the circulating booster.

The active component of the catalyst used in the oxygen clarifier is one or more of palladium, platinum, cerium and oxides thereof. The purifying agents used in the oxygen purifier are alumina and molecular sieve; and the filling mode of the catalyst is structured packing.

Specific Embodiment

FIG. 1 shows a safe and efficient device for recovering by-product oxygen from green water-electrolysis hydrogen production using a low-temperature method using a two-stage pressurization and single-expansion process.

The by-product oxygen with a pressure of about 1.6 MPaG from the green water-electrolysis hydrogen production system first enters the oxygen purifying system. In the oxygen purifying system, the oxygen first reacts impurities such as $H_2$ and CO into $H_2O$ and $CO_2$ in the oxygen purifier 3; $H_2O$ and $CO_2$ and the like in the oxygen are then adsorbed in the oxygen clarifier 6, and the content of $H_2O$ and $CO_2$ in oxygen discharged from the oxygen clarifier 6 is not more than 1 ppm; the purified oxygen continues to be sent into the plate heat exchanger 8, and is cooled to a liquid state by the cold fluid flowing back in the plate heat exchanger 8; then a part of the liquid oxygen is sent to the liquid oxygen pump 12, and is pressurized to high-pressure liquid oxygen of 8.7 MPaG by the liquid oxygen pump 12; the high-pressure liquid oxygen pressurized by the liquid oxygen pump continues to flow back to the plate heat exchanger 8, and flows out of the boundary after being reheated by the plate heat exchanger 8, and is sent to the user pipe network.

The circulating gas is divided into two parts after being pressurized by the argon circulating compressor 7.

One part of circulating gas is pumped out from a section of the argon circulating compressor 7. Argon with a pressure of about 3.5 MPaG directly enters the hot end of the plate heat exchanger 8. After being cooled to about 172K by the plate heat exchanger, the argon is pumped out and sent to the expansion end 11 of the expander for expansion. The fluid expanded to about 1.6 MPaG is returned to the cold end of the plate heat exchanger 8 as a cold source, reheated to normal temperature, and then discharged from the plate heat exchanger 8 and returned to the inlet of the argon circulating compressor 7.

The other part of circulating gas is pumped out from the last stage of the argon circulating compressor 7 with a pressure of about 7.2 MPaG, and enters the pressurizing end 9 of the expander to continue to be pressurized to 8.2 MPaG. After being cooled by the cooler 10, the high-pressure argon is sent to the hot end of the plate heat exchanger 8, serves as a high-pressure heat exchange source, and is cooled to the high-pressure liquid argon by the cold fluid to be discharged from the plate heat exchanger 8. The high-pressure liquid argon discharged from the plate heat exchanger 8 is throttled to about 1.5 MPaG by the throttle valve V4, and then returns to the cold end of the plate heat exchanger 8 to cool the heat flows such as high-pressure argon and oxygen as a cold source. This stream of fluid is sent to the inlet of the argon circulating compressor 7 after being reheated by the plate heat exchanger 8.

Considering that there is a certain leakage in the argon circulating booster 7 and the pressurizing end 9 of the expander, it is considered to add appropriate circulating argon as a supplement at the inlet of the argon circulating booster 7.

Figure 2:
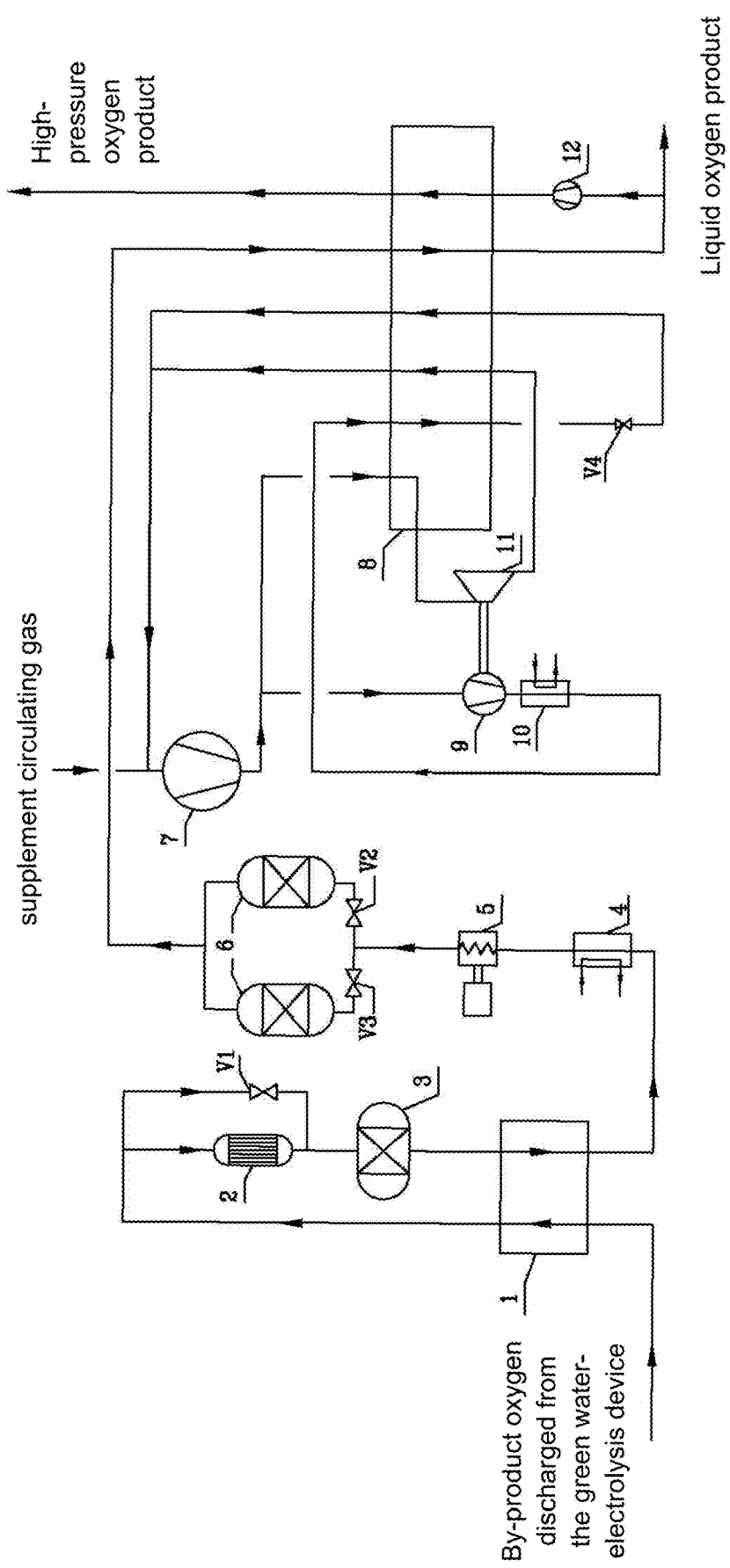
FIG. 2 is a schematic diagram of a first modified example of the present disclosure.

FIG. 2 shows a safe and efficient device for recovering by-product oxygen from green water-electrolysis hydrogen production using a low-temperature method using a one-stage pressurization and single-expansion process.

The by-product oxygen with a pressure of about 1.3 MPaG from the green water-electrolysis hydrogen production system first enters the oxygen purifying system. In the oxygen purifying system, the oxygen first reacts impurities such as $H_2$ and CO into $H_2O$ and $CO_2$ in the oxygen purifier 3; $H_2O$ and $CO_2$ and the like in the oxygen are then adsorbed in the oxygen clarifier 6, and the content of $H_2O$ and $CO_2$ in oxygen discharged from the oxygen clarifier 6 is not more than 1 ppm; the purified oxygen continues to be sent into the plate heat exchanger 8, and is cooled to a liquid state by the cold fluid flowing back in the plate heat exchanger 8; then a part of the liquid oxygen is sent to the liquid oxygen pump 12, and is pressurized to high-pressure liquid oxygen of 8.5 MPaG by the liquid oxygen pump 12; the high-pressure liquid oxygen pressurized by the liquid oxygen pump continues to flow back to the plate heat exchanger 8, and flows out of the boundary after being reheated by the plate heat exchanger 8, and is sent to the user pipe network.

The circulating air is divided into two parts after being pressurized by the air circulating compressor 7.

One part of circulating air continues to enter the pressurizing end 9 of the expander and continues to be pressurized to high-pressure air of 7.2 MPaG. After being cooled by the cooler 10, the high-pressure air is sent to the hot end of the plate heat exchanger 8, serves as a high-pressure heat exchange source, and is cooled to the high-pressure liquid by the cold fluid to be discharged from the plate heat exchanger 8. The high-pressure liquid air discharged from the plate heat exchanger 8 is throttled to about 2.3 MPaG by the throttle valve V4, and then returns to the cold end of the plate heat exchanger 8 to cool the heat flows such as high-pressure air and oxygen as a cold source. This stream of fluid is sent to the inlet of the circulating compressor 7 after being reheated by the plate heat exchanger 8.

The other part of circulating air directly enters the hot end of the plate heat exchanger 8. After being cooled to about 155K by the plate heat exchanger, the air is pumped out and sent to the expansion end 11 of the expander for expansion. The expanded fluid is returned to the cold end of the plate heat exchanger 8 as a cold source, reheated to normal temperature, and then discharged from the plate heat exchanger 8 and returned to the inlet of the air circulating compressor 7.

Considering that there is a certain leakage in the air circulating booster 7 and the pressurizing end 9 of the expander, it is considered to add appropriate circulating air as a supplement at the inlet of the air circulating booster 7.

Figure 3:
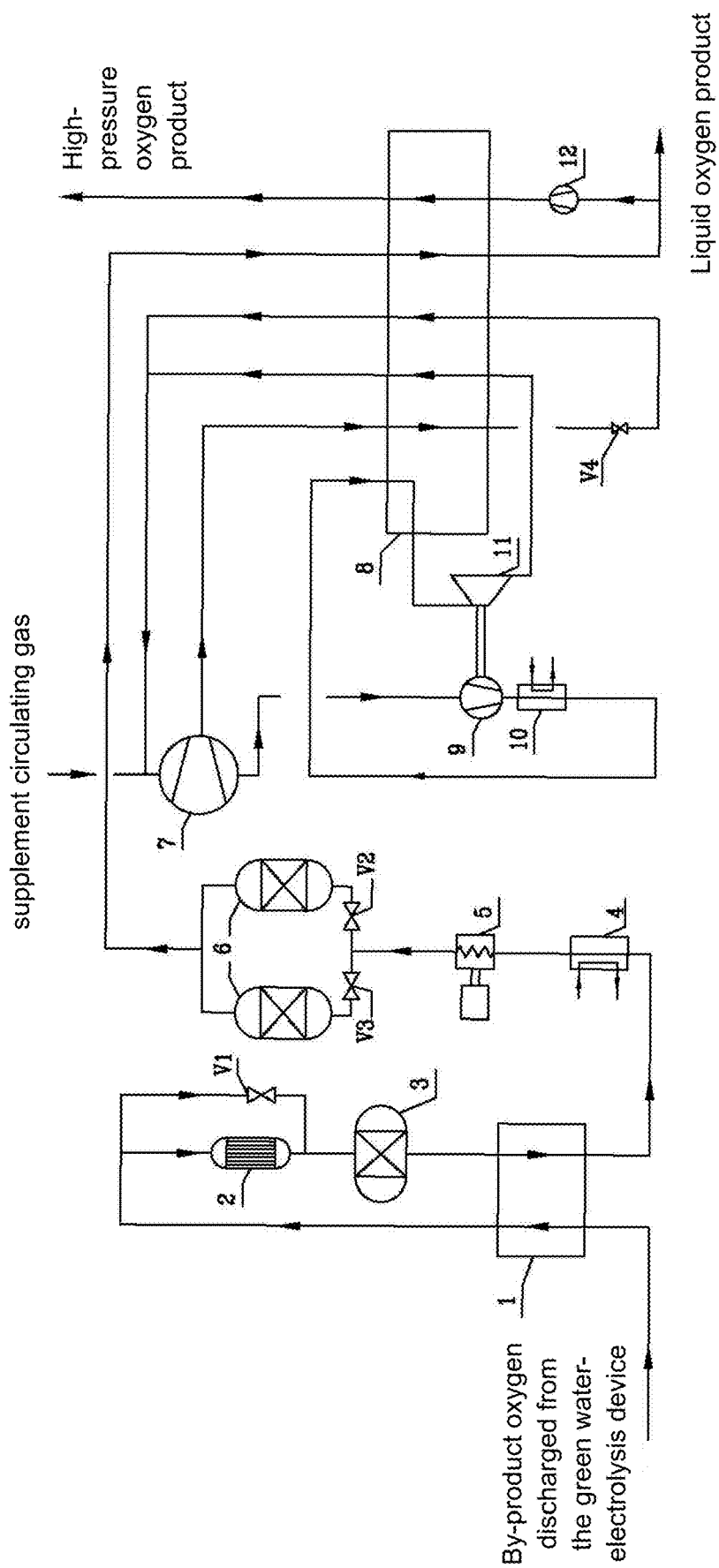
FIG. 3 is a schematic diagram of a second modified example of the present disclosure.

FIG. 3 shows a safe and efficient device for recovering by-product oxygen from green water-electrolysis hydrogen production using a low-temperature method using a two-stage pressurization and single-expansion process.

The oxygen with a pressure of about 1.3 MPaG from the water-electrolysis hydrogen production system first enters the oxygen purifying system. In the oxygen purifying system, the oxygen first reacts impurities such as $H_2$ and CO into $H_2O$ and $CO_2$ in the oxygen purifier 3; $H_2O$ and $CO_2$ and the like in the oxygen are then adsorbed in the oxygen clarifier 6, and the content of $H_2O$ and $CO_2$ in oxygen discharged from the oxygen clarifier 6 is not more than 1 ppm; the purified oxygen continues to be sent into the plate heat exchanger 8, and is cooled to a liquid state by the cold fluid flowing back in the plate heat exchanger 8; then a part of the liquid oxygen is sent to the liquid oxygen pump 12, and is pressurized to high-pressure liquid oxygen of 8.5 MPaG by the liquid oxygen pump 12; the high-pressure liquid oxygen pressurized by the liquid oxygen pump continues to flow back to the plate heat exchanger 8, and flows out of the boundary after being reheated by the plate heat exchanger 8, and is sent to the user pipe network.

The argon is divided into two parts after being pressurized by the argon circulating compressor 7.

One part of argon is pumped out from a section of the argon circulating compressor 7. Argon with a pressure of about 3.5 MPaG enters the pressurizing end 9 of the expander again to continue to be pressurized to 5.0 MPaG. After being cooled by the cooler 10, the high-pressure argon with a pressure of about 5.0 MPaG is sent to the hot end of the plate heat exchanger 8. After being cooled to about 170K by the plate heat exchanger, the argon is pumped out and sent to the expansion end 11 of the expander for expansion. The expanded fluid is returned to the cold end of the plate heat exchanger 8 as a cold source, reheated to normal temperature, and then discharged from the plate heat exchanger 8 and returned to the inlet of the argon circulating compressor 7.

The other part of argon is pumped out from the last stage of the argon circulating compressor 7 with a pressure of about 7.2 MPaG, and directly enters the hot end of the plate heat exchanger 8, serves as a high-pressure heat exchange source, and is cooled to the high-pressure liquid by the cold fluid to be discharged from the plate heat exchanger 8. The high-pressure liquid argon discharged from the plate heat exchanger 8 is throttled to about 1.5 MPaG by the throttle valve V4, and then returns to the cold end of the plate heat exchanger 8 to cool the heat flows such as high-pressure air and oxygen as a cold source. This stream of fluid is sent to the inlet of the argon circulating compressor 7 after being reheated by the plate heat exchanger 8.

Considering that there is a certain leakage in the argon circulating booster 7 and the pressurizing end 9 of the expander, it is considered to add appropriate circulating argon as a supplement at the inlet of the argon circulating booster 7.

Figure 4:
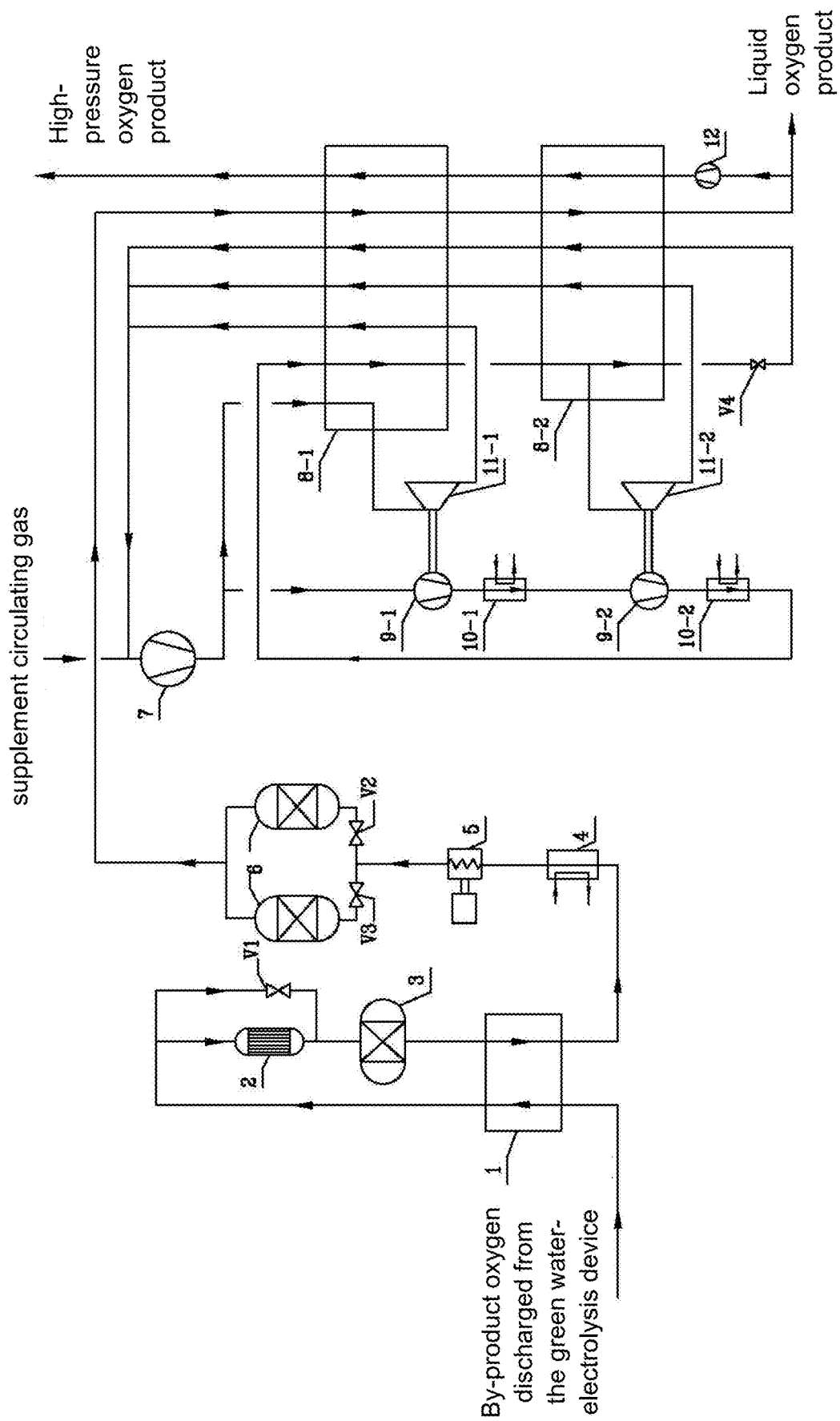
FIG. 4 is a schematic diagram of a third modified example of the present disclosure.

FIG. 4 shows a safe and efficient device for recovering by-product oxygen from green water-electrolysis hydrogen production using a low-temperature method using a one-stage pressurization and single-expansion process.

The oxygen with a pressure of about 1.3 MPaG from the water-electrolysis hydrogen production system first enters the oxygen purifying system. In the oxygen purifying system, the oxygen first reacts impurities such as $H_2$ and CO into $H_2O$ and $CO_2$ in the oxygen purifier 3; $H_2O$ and $CO_2$ and the like in the oxygen are then adsorbed in the oxygen clarifier 6, and the content of $H_2O$ and $CO_2$ in oxygen discharged from the oxygen clarifier 6 is not more than 1 ppm; the purified oxygen continues to be sent into the plate heat exchangers 8-1 and 8-2, and is cooled to a liquid state by the cold fluid flowing back in the plate heat exchangers 8-1 and 8-2; then a part of the liquid oxygen is sent to the liquid oxygen pump 12, and is pressurized to high-pressure liquid oxygen of 8.7 MPaG by the liquid oxygen pump 12; the high-pressure liquid oxygen pressurized by the liquid oxygen pump continues to flow back to the plate heat exchangers 8-1 and 8-2, and flows out of the boundary after being reheated by the plate heat exchangers 8-1 and 8-2, and is sent to the user pipe network.

The argon is divided into two parts after being pressurized to 3.5 MPaG by the argon circulating compressor 7. After entering the pressurizing end 9-1 of the high-temperature expander and being pressurized to about 5.2 MPaG, one part of argon is sent to the pressurizing end 9-2 of the low-temperature expander for further pressurization to about 7.7 MPaG after being cooled by the cooler 10-1, and is sent to the hot end of the plate heat exchanger 8-1 after being cooled by the cooler 10-2, which serves as a high-pressure heat exchange source and passes through the plate heat exchanger 8-1 and the plate heat exchanger 8-2 in sequence. This stream of high-temperature argon fluid is divided into two streams. One stream is cooled by cold fluid to high-pressure liquid argon and is discharged from the plate heat exchanger 8-2. The high-pressure liquid argon discharged from the plate heat exchanger 8-2 is throttled to 1.5 MPaG by the throttle valve V4 and then returned to the cold end of the plate heat exchanger 8-2, which serves as a cold source to cool heat flow such as high-pressure argon and oxygen through the plate heat exchanger 8-2 and the plate heat exchanger 8-1 in sequence. This stream of fluid is reheated by the plate heat exchanger 8-2 and the plate heat exchanger 8-1 in sequence and then sent to the inlet of the circulating compressor 7. The other stream is pumped out from the middle of the plate heat exchanger 8-2 for about 150K and is sent to the expansion end 11-2 of the low-temperature expander. After being expanded by the expansion end 11-2 of the low-temperature expander, this stream of fluid passes through the plate heat exchanger 8-2 and the plate heat exchanger 8-1 in sequence as a backflow cold source, and is reheated and sent to the inlet of the circulating compressor 7.

The other part of argon enters the hot end of the plate heat exchanger 8-1. After being cooled to about 178K by the plate heat exchanger 8-1, the argon is pumped out and sent to the expansion end 11-1 of the high-temperature expander for expansion. The expanded fluid is returned to the cold end of the plate heat exchanger 8-1 as a cold source, reheated to normal temperature, and then discharged from the plate heat exchanger 8-1 and returned to the inlet of the circulating compressor 7.

Considering that there is a certain leakage in the argon circulating booster 7 and the pressurizing ends 9-1 and 9-2 of the expander, it is considered to add appropriate circulating air as a supplement at the inlet of the circulating booster 7.

Finally, it should be noted that the present disclosure is not limited to the above embodiments, and many modifications are possible. All modifications that can be directly derived by or conceivable to those skilled in the art from the content of the present disclosure should be regarded as the scope of protection of the present disclosure.

What is claimed is:

1. A device for recovering by-product oxygen from water-electrolysis hydrogen production using a low-temperature method, wherein the device for recovering by-product oxygen from water-electrolysis hydrogen production comprises an oxygen clarifying system, a pressurizing and heat exchanging system, and a circulating gas compression and expansion refrigeration system; the oxygen clarifying system comprises an oxygen self-superheater, an oxygen heater, an oxygen purifier, a water chilling unit, an oxygen clarifier, a valve and a straight pipe section through which various devices are all connected to obtain pure oxygen, wherein the oxygen input end of the oxygen self-superheater is connected to the oxygen output end of a water-electrolysis hydrogen production system, the oxygen output end of the oxygen self-superheater is connected to the oxygen input end of an oxygen heater, the oxygen output end of the oxygen heater is connected to the oxygen input end of the oxygen purifier, the purified oxygen output end of the oxygen purifier is connected to the oxygen input end of the water chilling unit, the oxygen output end of the water chilling unit is connected to the oxygen input end of the oxygen clarifier, and the clarified oxygen at the output end of the oxygen clarifier is sent to the pressurizing and heat exchanging system through a pipeline.

2. The device for recovering by-product oxygen from water-electrolysis hydrogen production using a low-temperature method according to claim 1, wherein the pressurizing and heat exchanging system comprises a plate heat exchanger, a cold box and a low-temperature liquid oxygen pump, the circulating gas compression and expansion refrigeration system comprises a gas compression system and an expansion refrigeration system; the compression system comprises a gas booster for obtaining compressed gas; and the expansion refrigeration system comprises at least one booster turboexpander, a pressurizing end of the expander, a cooler and an expansion end of the expander.

3. The device for recovering by-product oxygen from water-electrolysis hydrogen production using a low-temperature method according to claim 2, wherein the circulating gas compression and expansion refrigeration system is highly coupled with the pressurizing and heat exchanging system, a stream of circulating gas is introduced into the circulating gas compression and expansion refrigeration system from the outside, the plate heat exchanger is provided with three positive flow channels and three reverse flow channels, the three positive flow channels comprise a clarified oxygen channel, a pressurized gas channel and a pressurized expansion gas channel, respectively, the three reverse flow channels comprise a high-pressure oxygen product channel, a throttle gas recovery channel and an expansion gas recovery channel, respectively, the input end of the clarified oxygen channel of the plate heat exchanger is connected to the oxygen output end of the oxygen clarifier, the output end of the clarified oxygen channel of the plate heat exchanger is connected to the input end of the liquid oxygen pump; the input end of the pressurized gas channel of the plate heat exchanger is connected to the output end of an aftercooler at the compression end of the booster turboexpander, the output end of the pressurized gas channel of the plate heat exchanger is connected to the input end of a throttle valve; the input end of the pressurized expansion gas channel of the plate heat exchanger is connected to a section of the output end of a circulating compressor, the output end of the pressurized expansion gas channel of the plate heat exchanger is connected to the input end of the expansion end of the expander; the input end of the high-pressure oxygen product channel of the plate heat exchanger is connected to the output end of the liquid oxygen pump, the output end of the oxygen product channel of the plate heat exchanger is connected to the output pipeline of the high-pressure oxygen product; the input end of the throttle gas recovery channel of the plate heat exchanger is connected to the output end of the throttle valve, the output end of the throttle gas recovery channel of the plate heat exchanger is connected to the input end of the circulating compressor; the input end of the expansion gas recovery channel of the plate heat exchanger is connected to the output end of the expansion end of the expander, the output end of the expansion gas recovery channel of the plate heat exchanger is connected to the input end of the circulating compressor, the input end of the circulating compressor is connected to the output ends of the throttling gas recovery channel and the expansion gas recovery channel of the plate heat exchanger, a section of the output end of the circulating compressor is connected to the input end of the pressurized expansion gas of the plate heat exchanger, the last-stage output end of the circulating compressor is connected to the pressurizing end of the expander, the input end of the pressurizing end of the expander is connected to the last-stage output end of the circulating compressor, and the output end of the pressurizing end of the expander is connected to the input end of the cooler.

4. The device for recovering by-product oxygen from water-electrolysis hydrogen production using a low-temperature method according to claim 3, wherein the device for recovering by-product oxygen from water-electrolysis hydrogen production is also capable of producing liquid oxygen products, when collecting the products, the liquid oxygen pump is used to pressurize the liquid oxygen to high-pressure liquid oxygen, the circulating gas is used to pressurize and exchange heat, and the high-pressure liquid oxygen is gasified into high-pressure oxygen.

5. The device for recovering by-product oxygen from water-electrolysis hydrogen production using a low-temperature method according to claim 3, wherein the circulating gas in the circulating gas compression and expansion refrigeration system is one of or a combination of several of nitrogen, air, argon or other gases suitable for circulation.

6. A method of the device for recovering by-product oxygen from water-electrolysis hydrogen production using a low-temperature method according to claim 1, wherein the method comprises the following steps: step 1: the by-product oxygen from the green water-electrolysis hydrogen production device enters the oxygen self-superheater, is preheated to a certain temperature, directly enters the oxygen clarifier through a pipeline when the temperature meets the requirement of entering the oxygen clarifier, and first enters an oxygen heater when the oxygen self-overheating temperature does not meet the requirement of entering the oxygen clarifier, and then enters the oxygen clarifier after being heated; the heated oxygen undergoes a chemical reaction in the oxygen clarifier, converts the impurity $H_2$ in the oxygen into $H_2O$, and converts CO into $CO_2$; after the reaction, the oxygen enters the hot end of the oxygen self-superheater, exchanges heat with the by-product oxygen from the water-electrolysis hydrogen production device to reduce the temperature, and continues to reduce the temperature after being cooled by a cooling unit, the water condensed at the bottom is directly drained in this process, and the cooled gas enters the oxygen purifier to remove impurities in the oxygen;

step 2, the purified oxygen enters a plate heat exchanger, and exchanges heat with the expanded argon of back flow in the heat exchanger, so that the oxygen is cooled to a liquid state to obtain liquid oxygen, which is divided into two streams, in which one stream of liquid is directly collected from a cold box to obtain liquid oxygen products; the stream of liquid raises the pressure of liquid oxygen by the liquid oxygen pump, and then is sent to the cold end of the plate heat exchanger for heat exchange to obtain pressurized oxygen;

step 3: a stream of supplemental circulating argon is mixed with the expanded argon flowing back from the plate heat exchanger, enters the gas compressor for compression, and is divided into two parts after pressurization, one part of pressurized argon pumped out from the middle of the booster is sent to the plate heat exchanger, and is pumped out and sent to the expander for expansion after being cooled to a certain temperature in the middle via the plate heat exchanger, the expanded argon is returned to the cold end of the plate heat exchanger to cool hot fluid as a cold source, and the returned argon is reheated and then discharged from the hot end of the plate heat exchanger and sent to the inlet of the circulating booster; the other part of argon is pumped out from the last-stage output end of the booster and sent to the pressurizing end of the expander for further pressurization and cooling, the pressurized and cooled circulating argon enters the plate heat exchanger to gasify high-pressure liquid oxygen as a high-pressure heat source, after being cooled by the plate heat exchanger, the high-pressure circulating argon is discharged from the plate heat exchanger and throttles back to the cold end of the plate heat exchanger to cool the hot fluid as a cold source, and the throttling fluid is reheated and then discharged from the hot end of the plate heat exchanger and sent to the inlet of the circulating booster.

7. The method of the device for recovering by-product oxygen from water-electrolysis hydrogen production using a low-temperature method according to claim 6, wherein the active component of the catalyst used in the oxygen clarifier is one or more of palladium, platinum, cerium and oxides thereof.

8. The method of the device for recovering by-product oxygen from water-electrolysis hydrogen production using a low-temperature method according to claim 6, wherein the purifying agents used in the oxygen purifier are alumina and molecular sieve; and the filling mode of the catalyst is structured packing.

* * * * *